United States Patent
Yang

(10) Patent No.: US 10,969,534 B2
(45) Date of Patent: Apr. 6, 2021

(54) BACKLIGHT ASSEMBLY, DISPLAY PANEL ASSEMBLY AND BACKLIGHT CONTROL METHOD

(71) Applicant: Wuhan China Star Optoelectronics Technology Co., Ltd., Wuhan (CN)

(72) Inventor: Yong Yang, Wuhan (CN)

(73) Assignee: Wuhan China Star Optoelectronics Technology Co., Ltd., Wuhan (CN)

( * ) Notice: Subject to any disclaimer, the term of this patent is extended or adjusted under 35 U.S.C. 154(b) by 0 days.

(21) Appl. No.: 16/612,781

(22) PCT Filed: Oct. 17, 2019

(86) PCT No.: PCT/CN2019/111615
§ 371 (c)(1),
(2) Date: Nov. 12, 2019

(87) PCT Pub. No.: WO2020/244120
PCT Pub. Date: Dec. 10, 2020

(65) Prior Publication Data
US 2020/0386934 A1    Dec. 10, 2020

(51) Int. Cl.
*G02F 1/1334* (2006.01)
*F21V 8/00* (2006.01)
*G02F 1/1343* (2006.01)

(52) U.S. Cl.
CPC .......... *G02B 6/005* (2013.01); *G02B 6/0068* (2013.01); *G02F 1/1334* (2013.01); *G02F 1/134309* (2013.01)

(58) Field of Classification Search
CPC .................................................. G02F 1/1334
See application file for complete search history.

(56) References Cited

U.S. PATENT DOCUMENTS

| | | | |
|---|---|---|---|
| 2005/0168401 A1 | 8/2005 | Lee et al. | |
| 2012/0050646 A1* | 3/2012 | Huang | G02F 1/133615 349/65 |
| 2015/0109763 A1 | 4/2015 | Shinkai et al. | |
| 2015/0260908 A1* | 9/2015 | Kiguchi | G02B 6/009 349/58 |
| 2019/0285936 A1* | 9/2019 | Luo | G02F 1/133528 |
| 2020/0209661 A1 | 7/2020 | Yang et al. | |
| 2020/0211484 A1 | 7/2020 | Gao et al. | |

FOREIGN PATENT DOCUMENTS

| | | |
|---|---|---|
| CN | 104303099 | 1/2015 |
| CN | 108445578 | 8/2018 |
| CN | 109656068 | 4/2019 |
| CN | 109739040 | 5/2019 |
| GB | 1362061 | 7/1974 |

\* cited by examiner

*Primary Examiner* — Edmond C Lau

(57) ABSTRACT

A backlight assembly is provided, which includes a side-lit backlight module having a plurality of light-emitting units disposed along a first direction, wherein a state of each of the light-emitting units can be individually controlled. A liquid crystal cell is disposed on the side-lit backlight module, wherein the liquid crystal cell has a plurality of pixel units disposed along a second direction, each pixel unit has two states of a transparent state and a cloudy state, and the state of each pixel unit can be individually controlled. The plurality of light-emitting units intersect with the plurality of pixel units.

9 Claims, 3 Drawing Sheets

BACKLIGHT ASSEMBLY, DISPLAY PANEL ASSEMBLY AND BACKLIGHT CONTROL METHOD

RELATED APPLICATIONS

This application is a National Phase of PCT Patent Application No. PCT/CN2019/111615 having International filing date of Oct. 17, 2019, which claims the benefit of priority of Chinese Patent Application No. 201910481348.X filed on Jun. 4, 2019. The contents of the above applications are all incorporated by reference as if fully set forth herein in their entirety.

FIELD AND BACKGROUND OF THE INVENTION

The present application relates to a field of display technologies, and in particular, to a backlight assembly, a display panel assembly, and a backlight control method.

Liquid crystal display panels are currently widely used in the market, and have many advantages, such as being light weight, thinner, no radiation, no flicker, low power consumption, and the like. As an important indicator of liquid crystal display panels, contrast ratio has become one of important parameters to measure quality of liquid crystal display panels.

In this regard, people use a variety of ways to improve the contrast ratio of liquid crystal display panels. For example, a negative liquid crystal is used instead of a positive liquid crystal to reduce liquid crystal light-leakage. For another example, a partitioning algorithm is used to carry out partition control with a miniature light-emitting diode backlight. However, aforementioned various techniques for improving the contrast ratio, either limited range for increasing contrast ratio, or involving complicated algorithms, may reduce maximum brightness of liquid crystal display panels.

Technical Problem

The purpose of embodiments of present application is to provide a backlight assembly, a display panel assembly, and a backlight control method, which can solve the technical problem that the contrast ratio of liquid crystal display panels cannot be effectively improved.

SUMMARY OF THE INVENTION

Technical Solution

An embodiment of the present application provides a backlight assembly, including:
a backlight assembly including:
a side-lit backlight module including a plurality of light-emitting units disposed along a first direction, wherein a light-emitting state of each of the light-emitting units is controlled individually; and
a liquid crystal cell disposed in the side-lit backlight module, wherein the liquid crystal cell includes a plurality of pixel units disposed along a second direction, each of the pixel units includes a transparent state and a cloudy state, and the state of each of the pixel units is controlled individually,
wherein the plurality of light-emitting units intersect with the plurality of pixel units.

In the backlight assembly described in the present application, the side-lit backlight module includes a light guide plate and a plurality of light sources, the light guide plate including a light-emitting surface and a light-incident surface, the light-emitting surface faces the liquid crystal cell, and the plurality of light sources are disposed along the first direction and face the light-incident surface.

In the backlight assembly described in the present application, the plurality of light sources are in one-to-one correspondence with the plurality of light-emitting units, and each of the light sources forms one of the light-emitting units via the light guide plate, the light-emitting state of each of the light-emitting units is controlled by the corresponding light source and the liquid crystal cell.

In the backlight assembly described in the present application, the backlight assembly further including a carrier member, wherein the liquid crystal cell is a polymer dispersed liquid crystal cell, and the side-lit backlight module and the polymer dispersed liquid crystal cell are disposed in the carrier member.

In the backlight assembly described in the present application, the liquid crystal cell includes:
a first substrate, a second substrate, and a polymer dispersed liquid crystal layer disposed between the first substrate and the second substrate,
wherein the first substrate is provided with a plurality of first pixel electrodes disposed along the second direction, the second substrate is provided with a first common electrode layer, the plurality of first pixel electrodes, the polymer dispersed liquid crystal layer, and the first common electrode layer constitute the plurality of pixel units,
wherein each of the pixel units is disposed corresponding to one of the first pixel electrodes, a portion of the polymer dispersed liquid crystal layer disposed corresponding to the one of first pixel electrodes, and a portion of the first common electrode layer disposed corresponding to the one of first pixel electrodes.

In the backlight assembly described in the present application, the polymer dispersed liquid crystal layer is a mixed layer of liquid crystal molecules and polymers.

In the backlight assembly described in the present application, the liquid crystal cell is a polymer dispersed liquid crystal cell, when a voltage is applied to the polymer dispersed liquid crystal cell, the polymer dispersed liquid crystal cell is in the transparent state, when the voltage is not applied to the polymer dispersed liquid crystal cell, the polymer dispersed liquid crystal cell is in the cloudy state.

In the backlight assembly described in the present application, the light-emitting unit and the pixel unit are both strip-shaped.

In the backlight assembly described in the present application, the liquid crystal cell is a polymer dispersed liquid crystal cell or a polymer network liquid crystal cell.

An embodiment of the present application further provides a display panel assembly, the display panel assembly including a backlight assembly and a display panel disposed on the backlight assembly, the backlight assembly including:
a side-lit backlight module including a plurality of light-emitting units disposed along a first direction, wherein a light-emitting state of each of the light-emitting units is controlled individually; and
a liquid crystal cell disposed in the side-lit backlight module, wherein the liquid crystal cell includes a plurality of pixel units disposed along a second direction, each of the pixel units includes a transparent state and a cloudy state, and the state of each of the pixel units is controlled individually,
wherein the plurality of light-emitting units intersect with the plurality of pixel units.

In the display panel assembly described in the present application, the side-lit backlight module includes a light guide plate and a plurality of light sources, the light guide plate including a light-emitting surface and a light-incident surface, the light-emitting surface faces the liquid crystal cell, and the plurality of light sources are disposed along the first direction and face the light-incident surface.

In the display panel assembly described in the present application, the plurality of light sources are in one-to-one correspondence with the plurality of light-emitting units, and each of the light sources forms one of the light-emitting units via the light guide plate, the light-emitting state of each of the light-emitting units is controlled by the corresponding light source and the liquid crystal cell.

In the display panel assembly described in the present application, the display panel assembly further including a carrier member, wherein the liquid crystal cell is a polymer dispersed liquid crystal cell, and the side-lit backlight module and the polymer dispersed liquid crystal cell are disposed in the carrier member.

In the display panel assembly described in the present application, the liquid crystal cell includes:

a first substrate, a second substrate, and a polymer dispersed liquid crystal layer disposed between the first substrate and the second substrate, wherein the first substrate is provided with a plurality of first pixel electrodes disposed along the second direction, the second substrate is provided with a first common electrode layer, the plurality of first pixel electrodes, the polymer dispersed liquid crystal layer; and the first common electrode layer constitute the plurality of pixel units, wherein each of the pixel units is disposed corresponding to one of the first pixel electrodes, a portion of the polymer dispersed liquid crystal layer disposed corresponding to the one of first pixel electrodes, and a portion of the first common electrode layer disposed corresponding to the one of first pixel electrodes.

In the display panel assembly described in the present application, the polymer dispersed liquid crystal layer is a mixed layer of liquid crystal molecules and polymers.

In the display panel assembly described in the present application, the liquid crystal cell is a polymer dispersed liquid crystal cell, and when a voltage is applied to the polymer dispersed liquid crystal cell, the polymer dispersed liquid crystal cell is in the transparent state, when the voltage is not applied to the polymer dispersed liquid crystal cell, the polymer dispersed liquid crystal cell is in the cloudy state.

In the display panel assembly described in the present application, the light-emitting unit and the pixel unit are both strip-shaped.

In the display panel assembly described in the present application, the liquid crystal cell is a polymer dispersed liquid crystal cell or a polymer network liquid crystal cell.

An embodiment of the present application further provides a backlight control method, where the backlight control method is applied to the display, panel assembly described above, wherein the plurality of light-emitting units intersect with the plurality of pixel units to form a plurality of backlight regions, the backlight control method including:

determining whether a maximum brightness region of a display screen is corresponding to the same backlight region;

if yes, controlling the side-lit backlight module and the liquid crystal cell to make the corresponding light-emitting unit emitting light and the corresponding pixel unit in the transparent state;

if not, controlling the side-lit backlight module and the liquid crystal cell to make the light-emitting units corresponding to a size of the backlight regions having the maximum brightness region of the display screen emitting light sequentially and the corresponding pixel units in the transparent state.

Beneficial Effect

The backlight assembly, the display panel assembly and the backlight control method of the embodiments of the present invention can realize a two-dimensional partition control of the backlight assembly by individually controlling a light-emitting state of each light-emitting unit and a state of each pixel unit, thereby improving the contrast ratio of display and further improving display quality.

BRIEF DESCRIPTION OF THE SEVERAL VIEWS OF THE DRAWINGS

In order to illustrate the technical solutions of the present disclosure or the related art in a clearer manner, the drawings desired for the present disclosure or the related art will be described hereinafter briefly. Obviously, the following drawings merely relate to some embodiments of the present disclosure, and based on these drawings, a person skilled in the art may obtain the other drawings without any creative effort.

DESCRIPTION OF SPECIFIC EMBODIMENTS OF THE INVENTION

The following content combines with the drawings and the embodiment for describing the present invention in detail. It is obvious that the following embodiments are only some embodiments of the present invention. For the skilled persons of ordinary skill in the art without creative effort, the other embodiments obtained thereby are still covered by the present invention.

In the description of the present application, it is to be understood that the terms "first" and "second" are used for descriptive purposes only and are not to be construed as indicating or implying a relative importance or implicitly indicating the number of technical features indicated. Thus, features defining "first" or "second" may, include one or more of the described features either explicitly or implicitly. In the description of the present application, "a plurality of articles" means two or more, unless specifically defined otherwise.

Figure 1:
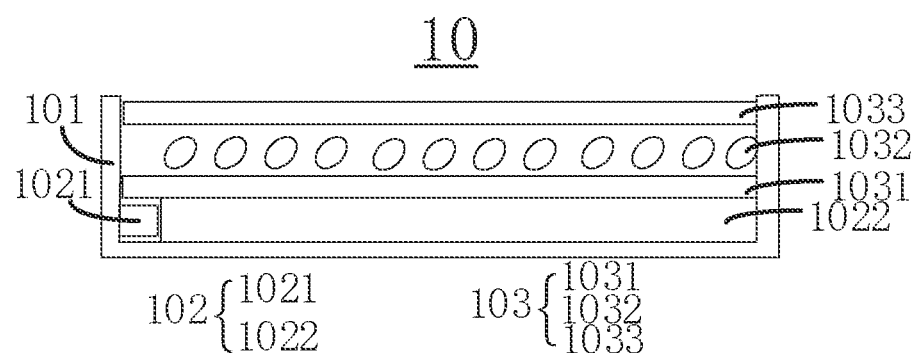
FIG. 1 is a schematic structural diagram of a backlight assembly according to an embodiment of the present application.
Figure 2:
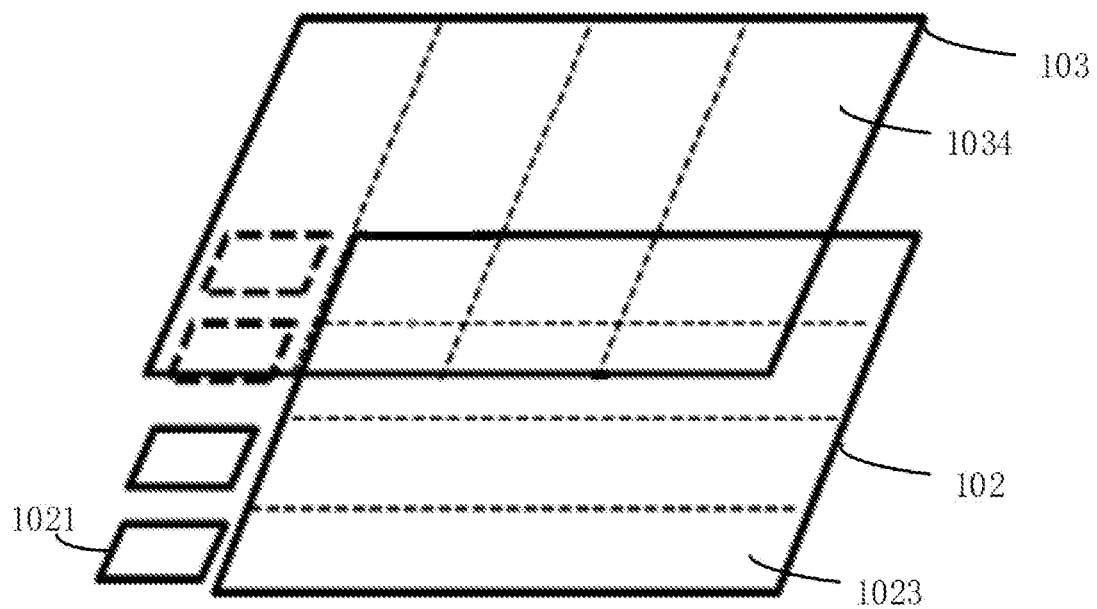
FIG. 2 is a schematic exploded diagram of the backlight assembly according to an embodiment of the present application.

Referring to FIG. 1 and FIG. 2, where FIG. 1 is a schematic structural diagram of a backlight assembly according to an embodiment of the present disclosure, FIG.

2 is a schematic exploded diagram of the backlight assembly according to an embodiment of the present application. As shown in FIG. 1 and FIG. 2, a backlight assembly 10 of the embodiment of the present invention includes a carrier member 101, a side-lit backlight module 102, and a liquid crystal cell 103. The side-lit backlight module 102 and the liquid crystal cell 103 are both disposed in the carrier member 101, and the liquid crystal cell 103 is disposed on the side-lit backlight module 102.

The side-lit backlight module 102 has a plurality of light-emitting units 1023 disposed along a first direction, and a light-emitting state of each of the light-emitting units 1023 can be individually controlled. The liquid crystal cell 103 has a plurality of pixel units 1034 disposed along a second direction. Each of the pixel units 1034 has two states, which a first state is a transparent state and a second state is a cloudy state. The state of each of the pixel units is controlled individually. The plurality of light-emitting units 1023 intersect with the plurality of pixel units 1034. It should be noted that the first direction and the second direction in the embodiment of the present application are not limited, the first direction and the second direction are merely required to be different directions.

In one embodiment, the liquid crystal cell 103 may be a polymer dispersed liquid crystal cell. In another embodiment, the liquid crystal cell 103 can be a polymer network liquid crystal cell.

The backlight assembly 10 of the embodiment of the present invention is used in combination with the side-lit backlight module 102 and the liquid crystal cell 103, which realizes a two-dimensional partition control of the backlight assembly 10 by individually controlling a light-emitting state of each light-emitting unit 1023 and a state of each pixel unit 1034, thereby improving the contrast ratio of display and further improving display quality. In one embodiment, the backlight assembly 10 of the embodiment of the present invention can individually control the side-lit backlight module 102 and the polymer dispersed liquid crystal 103 through a control module (not shown). For example, the control module can individually control the light-emitting state of each of the light-emitting units 1023, that is, the control module can individually control whether each of the light-emitting units 1023 emits light or does not emit light. The control module can also individually control the state of each pixel unit 1034, that is, the control module can individually control each pixel unit 1034 to be in the transparent state or in the cloudy state.

Further, the light-emitting unit 1023 and the pixel unit 1034 are both strip-shaped. In the side-lit backlight module 102, each of the light-emitting units 1023 in the strip-shaped extends along the second direction, that is, the side-lit backlight module 102 is divided into a plurality of light-emitting units 1023 arranged in the first direction. In the liquid crystal cell 103, each of the pixel units 1034 extends in the strip-shaped along the first direction, that is, the liquid crystal cell 103 is also divided into a plurality of pixel units 1034 arranged in the second direction.

Specifically, the side-lit backlight module 102 includes a light guide plate 1022 and a plurality of light sources 1021. The light guide plate 1022 has a light-emitting surface and a light-incident surface, and the light-emitting surface is disposed facing the liquid crystal cell 103. The plurality of light sources 1021 are disposed along the first direction and face the light-incident surface. The light emitted from the light sources 1021 is incident on the light-incident surface of the light guide plate 1022, and then emitted on the liquid crystal cell 103 through the light-emitting surface of the light guide plate 1022. When a voltage is applied to the polymer dispersed liquid crystal cell 103, the polymer dispersed liquid crystal cell 103 is presented in the transparent state, the light is emitted through the polymer dispersed liquid crystal cell 103. When no voltage is applied to the polymer dispersed liquid crystal cell 103, the polymer dispersed liquid crystal cell 103 is presented in the cloudy state, and the light cannot be emitted through the polymer dispersed liquid crystal cell.

In one embodiment, the plurality of light sources 1021 are in one-to-one correspondence with the plurality of light-emitting units 1023, and each of the light sources 1021 forms one of the light-emitting units 1023 via the light guide plate 1022, and the light-emitting state of each of the light-emitting units 1023 is controlled by the corresponding light source 1021 and the liquid crystal cell 103, Of course, in order to improve illuminating effect, a plurality of light sources 1021 can be disposed corresponding to one light-emitting unit 1023, and the light-emitting state of each light-emitting unit 1023 is controlled by the corresponding plurality of light sources 1021.

The liquid crystal cell 103 includes a first substrate 1031, a second substrate 1033, and a polymer dispersed liquid crystal layer 1032 disposed between the first substrate 1031 and the second substrate 1033. The first substrate 1031 is provided with a plurality of first pixel electrodes (not shown) disposed along the second direction, and the second substrate 1033 is provided with a first common electrode layer (not shown), the plurality of first pixel electrodes, the polymer dispersed liquid crystal layer 1032, and the first common electrode layer constitute a plurality of pixel units 1034. Each of the pixel units 1034 is disposed corresponding to one of first pixel electrodes, a portion of the polymer dispersed liquid crystal layer disposed corresponding to the one of first pixel electrodes, and a portion of the first common electrode layer disposed corresponding to the one of first pixel electrodes.

The backlight assembly of embodiments of the present application can apply a predetermined voltage on the first common electrode layer, and control the state of each pixel unit by individually controlling the voltage on the pixel electrode corresponding to each pixel unit 1034.

The polymer dispersed liquid crystal layer 1032 is also called a liquid crystal dimming film, which mixes small molecular liquid crystal with polymer prepolymer, and is polymerized under certain conditions to form micron-sized liquid crystal droplets uniformly dispersed in a polymer network, and then the dielectric anisotropy of the liquid crystal molecules is used to obtain a material having electro-optical response characteristics, which mainly works between a scattering state and a transparent state and has a certain gray scale.

The polymer dispersed liquid crystal layer 1032 is a mixed layer of liquid crystal small molecules and polymers. The polymer dispersed liquid crystal cell 103 drives a state of the polymer dispersed liquid crystal layer 1032 corresponding to each pixel unit 1034 through the first common electrode layer and the first pixel electrode. When a voltage is applied to the polymer dispersed liquid crystal cell 103, the polymer dispersed liquid crystal cell 103 is in a transparent state, while no voltage is applied to the polymer dispersed liquid crystal cell 103, the polymer dispersed liquid crystal cell 103 is in a cloudy state.

Figure 3:
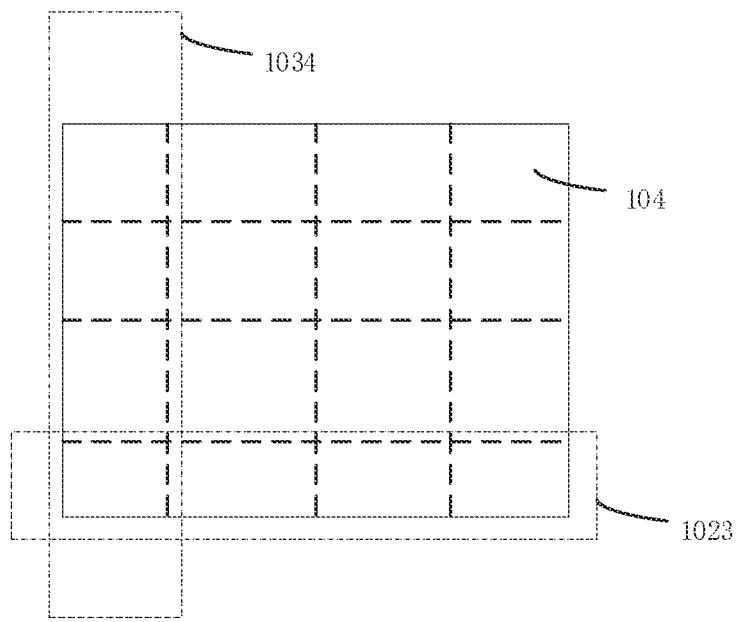
FIG. 3 is a schematic diagram of a principle of the backlight assembly according to an embodiment of the present application.

Please refer to FIG. 3, which is a schematic diagram of a principle of the backlight assembly according to an embodiment of the present application. As shown in FIG. 1, FIG. 2, and FIG. 3, a plurality of light-emitting units 1023 and a plurality of pixel units 1034 are disposed to form a plurality of backlight regions 104, and each of the backlight regions 104 can be controlled by a light-emitting unit 1023 and a pixel unit 1034. The backlight assembly 10 of embodiments of the present invention achieves a two-dimensional partition control of the backlight assembly by individually controlling a light-emitting state of each light-emitting unit 1023 and a state of each pixel unit 1034, thereby improving the contrast ratio of display and further improving display quality.

For example, as shown in FIG. 3, which the side-lit backlight module has four light-emitting units: a first light-emitting unit, a second light-emitting unit, a third light-emitting unit, and a fourth light-emitting unit. The liquid crystal cell has four pixel units: a first pixel unit, a second pixel unit, a third pixel unit, and a fourth pixel unit. The four light-emitting units are disposed to intersect with the four pixel units to form 16 backlight regions. The first backlight region is controlled by the first light-emitting unit and the first pixel unit, the second backlight region is controlled by, the first light-emitting unit and the second pixel unit, and so on.

Meanwhile, the maximum brightness region in a display screen corresponds to the first backlight region, which the first light-emitting unit is controlled to emit light and the first pixel unit is controlled to be in a transparent state. Specifically, in the side-lit backlight assembly, only the light source corresponding to the first light-emitting unit is driven to emit light, and in the liquid crystal cell where only the pixel electrode corresponding to the first pixel unit is required to be provided with a voltage, so that the first pixel unit is in a transparent state and other pixel units are in a cloudy state without applying a voltage.

Meanwhile, if the maximum brightness region in the display screen occupies at least two light-emitting units or at least two pixel units, an algorithm is required to perform backlight assembly partition display.

Specifically, it can be that determining whether a maximum brightness region of a display screen is corresponding to the same backlight region; if yes, controlling the side-lit backlight module and the liquid crystal cell to make the corresponding light-emitting unit emits light and the corresponding pixel unit is in a transparent state; if not, controlling the side-lit backlight module and the liquid crystal cell to make the light-emitting units corresponding to a size of the backlight regions having the maximum brightness region of the display screen emitting light sequentially and also the corresponding pixel units in the transparent state.

The backlight assembly provided by the embodiments of the present invention realizes a two-dimensional partition control of the backlight assembly by individually controlling a light-emitting state of each light-emitting unit and a state of each pixel unit, thereby improving the contrast ratio of display and further improving display quality.

Figure 4:
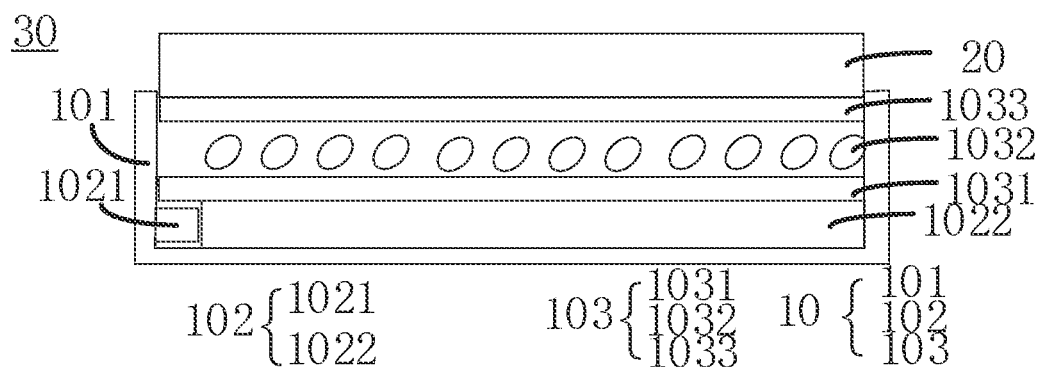
FIG. 4 is a schematic structural diagram of a display panel assembly according to an embodiment of the present application.

Please refer to FIG. 4, where FIG. 4 is a schematic structural diagram of a display panel assembly according to an embodiment of the present application. As shown in FIG. 4, the display panel assembly 30 provided by the embodiment of the present application includes a backlight assembly 10 and a display panel 20 disposed on the backlight assembly 10. The backlight assembly 10 can refer to aforementioned description, and details are not described herein.

Figure 5:
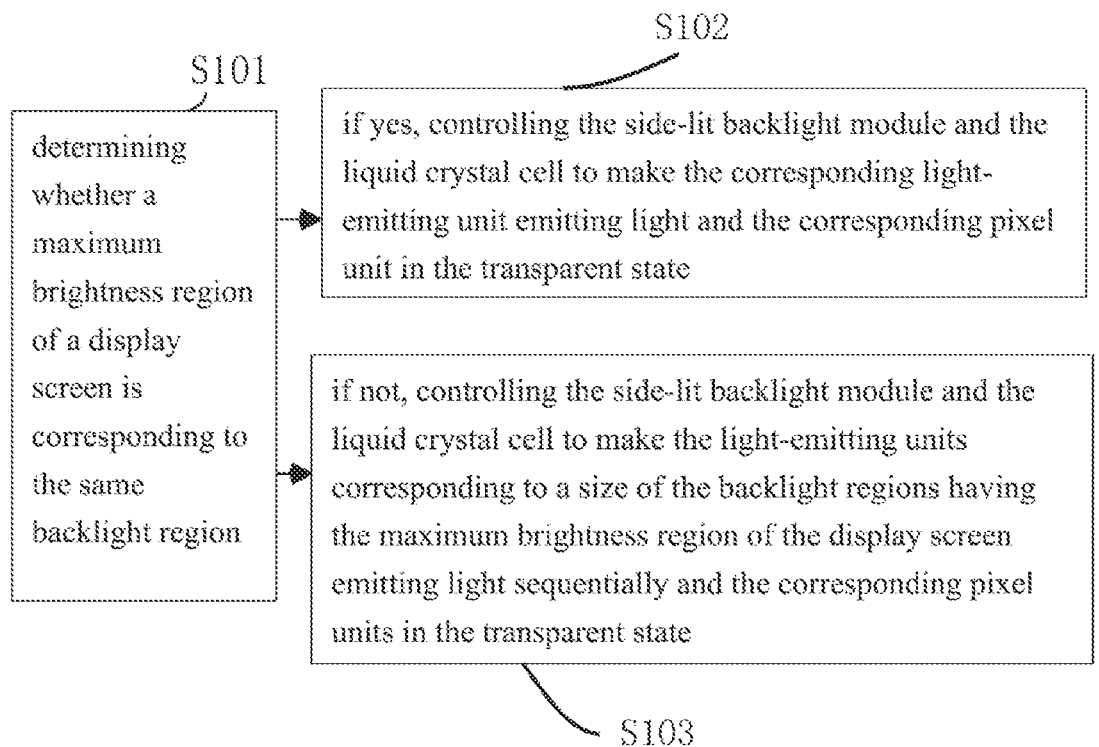
FIG. 5 is a schematic flowchart of a backlight control method of the display panel assembly according to an embodiment of the present application.

Please refer to FIG. 5, FIG. 5 is a schematic flowchart of a backlight control method of a display panel assembly according to an embodiment of the present application. The backlight control method is applied to the display panel assembly described above, wherein a plurality of light-emitting units and a plurality of pixel units are disposed to form a plurality of backlight regions, and the backlight control method including:

S101, determining whether a maximum brightness region of a display screen is corresponding to the same backlight region;

S102, if yes, controlling the side-lit backlight module and the liquid crystal cell to make the corresponding light-emitting unit emitting light and the corresponding pixel unit in the transparent state; and S103, if not, controlling the side-lit backlight module and the liquid crystal cell to make the light-emitting units corresponding to a size of the backlight regions having the maximum brightness region of the display screen emitting light sequentially and the corresponding pixel units in the transparent state.

Embodiments of the present invention have been described, but not intending to impose any unduly constraint to the appended claims. For a person skilled in the art, any modification of equivalent structure or equivalent process made according to the disclosure and drawings of the present invention, or any application thereof, directly or indirectly, to other related fields of technique, is considered encompassed in the scope of protection defined by the claims of the present invention.

What is claimed is:

1. A backlight control method using in a display panel assembly, wherein the display panel assembly comprising a backlight assembly and a display panel disposed on the backlight assembly, the backlight assembly comprising:
    a side-lit backlight module comprising a plurality of light-emitting units disposed along a first direction, wherein a light-emitting state of each of the light-emitting units is controlled individually; and
    a liquid crystal cell disposed in the side-lit backlight module, wherein the liquid crystal cell comprises a plurality of pixel units disposed along a second direction, each of the pixel units comprises a transparent state and a cloudy state, and the state of each of the pixel units is controlled individually,
    wherein the plurality of light-emitting units intersect with the plurality of pixel units;
    wherein the plurality of light-emitting units intersect with the plurality of pixel units to form a plurality of backlight regions, the backlight control method comprising:
    determining whether a maximum brightness region of a display screen is corresponding to a same backlight region;
    if yes, controlling the side-lit backlight module and the liquid crystal cell to make the corresponding light-emitting unit emitting light and the corresponding pixel unit in the transparent state;
    if not, controlling the side-lit backlight module and the liquid crystal cell to make the light-emitting units corresponding to a size of the backlight regions having the maximum brightness region of the display screen emitting light sequentially and the corresponding pixel units in the transparent state.

2. The backlight control method of claim 1, wherein the side-lit backlight module comprises a light guide plate and a plurality of light sources, the light guide plate comprising a light-emitting surface and a light-incident surface, the light-emitting surface faces the liquid crystal cell, and the plurality of light sources are disposed along the first direction and face the light-incident surface.

3. The backlight control method of claim 1, wherein the plurality of light sources are in one-to-one correspondence with the plurality of light-emitting units, and each of the light sources forms one of the light-emitting units via the light guide plate, the light-emitting state of each of the light-emitting units is controlled by the corresponding light source and the liquid crystal cell.

4. The backlight control method of claim 1, further comprising a carrier member, wherein the liquid crystal cell is a polymer dispersed liquid crystal cell, and the side-lit backlight module and the polymer dispersed liquid crystal cell are disposed in the carrier member.

5. The backlight control method of claim 1, wherein the liquid crystal cell comprises:
a first substrate, a second substrate, and a polymer dispersed liquid crystal layer disposed between the first substrate and the second substrate,
wherein the first substrate is provided with a plurality of first pixel electrodes disposed along the second direction, the second substrate is provided with a first common electrode layer, the plurality of first pixel electrodes, the polymer dispersed liquid crystal layer, and the first common electrode layer constitute the plurality of pixel units,
wherein each of the pixel units is disposed corresponding to one of the first pixel electrodes, a portion of the polymer dispersed liquid crystal layer disposed corresponding to the one of first pixel electrodes, and a portion of the first common electrode layer disposed corresponding to the one of first pixel electrodes.

6. The backlight control method of claim 1, wherein the polymer dispersed liquid crystal layer is a mixed layer of liquid crystal molecules and polymers.

7. The backlight control method of claim 1, wherein the liquid crystal cell is a polymer dispersed liquid crystal cell, and when a voltage is applied to the polymer dispersed liquid crystal cell, the polymer dispersed liquid crystal cell is in the transparent state, when the voltage is not applied to the polymer dispersed liquid crystal cell, the polymer dispersed liquid crystal cell is in the cloudy state.

8. The backlight control method of claim 1, wherein the light-emitting unit and the pixel unit are both strip-shaped.

9. The backlight control method of claim 1, wherein the liquid crystal cell is a polymer dispersed liquid crystal cell or a polymer network liquid crystal cell.

* * * * *

UNITED STATES PATENT AND TRADEMARK OFFICE
CERTIFICATE OF CORRECTION

PATENT NO. : 10,969,534 B2  
APPLICATION NO. : 16/612781  
DATED : April 6, 2021  
INVENTOR(S) : Yong Yang Page 1 of 1

It is certified that error appears in the above-identified patent and that said Letters Patent is hereby corrected as shown below:

On the Title Page

Insert the following:
-- (30) Foreign Application Priority Data
Jun. 4, 2019 (CN) ………………. 201910481348.X --

Signed and Sealed this  
Tenth Day of August, 2021

Drew Hirshfeld  
*Performing the Functions and Duties of the*  
*Under Secretary of Commerce for Intellectual Property and*  
*Director of the United States Patent and Trademark Office*